(12) United States Patent
Reza et al.

(10) Patent No.: US 12,175,204 B2
(45) Date of Patent: Dec. 24, 2024

(54) ASPECT PROMPTING FRAMEWORK FOR LANGUAGE MODELING

(71) Applicant: Oracle International Corporation, Redwood Shores, CA (US)

(72) Inventors: Shahid Reza, Karnataka (IN); Nagaraj N. Bhat, Karnataka (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 384 days.

(21) Appl. No.: 17/584,068

(22) Filed: Jan. 25, 2022

(65) Prior Publication Data

US 2023/0237277 A1 Jul. 27, 2023

(51) Int. Cl.
| | |
|---|---|
| *G06F 40/169* | (2020.01) |
| *G06F 40/186* | (2020.01) |
| *G06F 40/284* | (2020.01) |
| *G06F 40/40* | (2020.01) |
| *G06N 3/0455* | (2023.01) |
| *G06N 3/0475* | (2023.01) |
| *G06N 3/096* | (2023.01) |
| *G06V 30/19* | (2022.01) |

(52) U.S. Cl.
CPC ............ *G06F 40/40* (2020.01); *G06F 40/186* (2020.01); *G06F 40/284* (2020.01); *G06V 30/19147* (2022.01)

(58) Field of Classification Search
CPC ...... G06F 40/40; G06F 40/186; G06F 40/284; G06F 40/169; G06V 30/19147; G06N 3/0455; G06N 3/0475; G06N 3/096
See application file for complete search history.

(56) References Cited

U.S. PATENT DOCUMENTS

| | | | | |
|---|---|---|---|---|
| 11,508,360 | B2* | 11/2022 | Peng | G06F 40/44 |
| 2022/0036153 | A1* | 2/2022 | O'Malia | G06N 3/042 |
| 2022/0147713 | A1* | 5/2022 | Garimella | G06F 40/56 |

OTHER PUBLICATIONS

Brown, et al. Language Models for Few-Shot Learners, *OpenAI*, arXiv:2002.14165v4 Jul. 22, 2020, 75 pages.

(Continued)

*Primary Examiner* — Pierre Louis Desir
*Assistant Examiner* — Kristen Michelle Masters
(74) *Attorney, Agent, or Firm* — Kilpatrick Townsend & Stockton LLP

(57) ABSTRACT

Techniques for dynamically developing a contextual set of prompts based on relevant aspects extracted from s set of training data. One technique includes obtaining training data comprising text examples and associated labels, extracting aspects from the training data, generating prompting templates based on the training data and the extracted aspects, concatenating each of the text examples with the respective generated prompting template to create prompting functions, training a machine learning language model on the prompting functions to predict a solution for a task, where the training is formulated as a masked language modeling problem with blanks of the prompting templates being set as text labels and expected output for the task being set as specified solution labels, and the training learns or updates model parameters of the machine learning language model for performing the task. The machine learning language model is provided with the learned or updated model parameters.

20 Claims, 8 Drawing Sheets

(56) References Cited

OTHER PUBLICATIONS

Ziegler, et al., FINE-Tuning Language Models for Human Preferences, *OpenAI*, arCiv:1919.08593v2 Jan. 8, 2020, 26 pages.
Liu et al., "Pre-train, Prompt, and Predict: A Systematic Survey of Prompting Methods in Natural Language Processing", Jul. 28, 2021, 46 pages.

* cited by examiner

ASPECT PROMPTING FRAMEWORK FOR LANGUAGE MODELING

FIELD

The present disclosure relates generally to prompt engineering, and more particularly, to techniques for dynamically developing a contextual set of prompts based on relevant aspects extracted from s set of training data.

BACKGROUND

Early natural language processing (NLP) models relied heavily on feature engineering where researchers used domain knowledge to extract key information from training datasets and provide models with the guidance needed to learn from the data. But with the advent of neural network models for NLP, the focus pivoted from feature engineering to model architecture engineering. Neural networks enabled features to be learned jointly with the training of the models themselves. NLP model training evolved as researchers embraced techniques called pre-training and fine-tuning. In pre-training, a model such as BERT is pre-trained with the ability to complete a range of different language tasks, like summarization and text generation. Because the raw textual data necessary to train language models (e.g., ebooks and online encyclopedia articles) is available in abundance, these models can be pre-trained on large datasets and in the process learn general-purpose language features. The pre-trained language models can then be adapted to different tasks through a process of fine-tuning using task-specific optimizations. Pre-training and fine-tuning have led to a number of advances in the field of NLP.

As NLP evolves further a new technique call "prompt-based learning" has arisen, and the focus has again pivoted but this time from pre-training and fine-tuning to prompt engineering. Prompt engineering is the process of creating a prompting function that results in good model performance on a target application. This can be a single prompt or multiple prompts. For example, given the task of analyzing the sentiment of the sentence "The food was good but the service was bad," researchers could continue with the prompt "It was [blank]" and ask a language model to fill in the blank with an emotion. Or they could append an incomplete sentence like "Alaska's capital is [blank]" with prompts containing examples such as "Pennsylvania's capital is Harrisburg. New York's capital is Albany. California's capital is [blank]." Prompt-based learning thus seeks to better mine the knowledge about facts, reasoning, understanding sentiment, and more from pre-training and fine-tuning. Given a range of carefully designed prompts, a language model trained in an unsupervised or supervised fashion can be used to solve a number of tasks. For example, research has shown that a prompt may be worth greater than fifty conventional data points, suggesting prompt-based learning enables a significant leap in training efficiency.

BRIEF SUMMARY

Techniques are provided (e.g., a method, a system, non-transitory computer-readable medium storing code or instructions executable by one or more processors) for dynamically developing a contextual set of prompts based on relevant aspects extracted from s set of training data.

In various embodiments, a method is provided for that comprises: obtaining, by a computing system, a set of training data comprising text examples and associated labels, wherein the labels comprise: (i) text labels that relate to possible solutions for a task to be learned by a machine learning language model, and (ii) specified solution labels for the task; extracting, by the computing system, aspects from the set of training data, wherein each of the aspects is a subject of a text example, a topic of discussion within a text example, an entity within a text example, or any combination thereof; generating, by the computing system, prompting templates based on the set of training data and the extracted aspects, wherein each of the prompting templates comprises a prompt for a text example, an aspect extracted from the text example, and a blank; concatenating, by the computing system, each of the text examples with the respective generated prompting template to create prompting functions; training, by the computing system, the machine learning language model on the prompting functions to predict a solution for the task, wherein the training is formulated as a masked language modeling problem with the blanks of the prompting templates being set as the text labels and expected output for the task being set as the specified solution labels, and wherein the training learns or updates model parameters of the machine learning language model for performing the task; and providing, by the computing system, the machine learning language model with the learned or updated model parameters.

In some embodiments, the machine learning language model is a pre-trained model or a fine-tuned model, and the set of training data comprises less than twenty text examples.

In some embodiments, the aspects are extracted using an aspect model and the aspects are detected for extraction based on statistical properties of the aspects learned by the aspect model during training and implemented during inference via a learned set of model parameters.

In some embodiments, the training comprises, for each prompting function: (a) completing the blank with text labels associated with the text example to generate multiple unique prompting templates for the text example, (b) masking the text labels with mask tokens, (c) predicting, by the machine learning language model, text for the mask tokens based on learned statistical properties of word sequences and linguistic patterns given text in the prompting function, (d) evaluating, by the machine learning language model, conditional probabilities for predicting the text for the mask tokens provided the prompting function, and (e) combining, by the machine learning language model, the conditional probabilities together to predict a joint probability value for the solution.

In some embodiments, the training further comprises, for each prompting function: (f) measuring a difference between the text labels and the text predicted for the mask tokens using a first cost function, (g) measuring a difference between a specified solution label and the joint probability value predicted for the solution using a second cost function, and (h) modifying the model parameters with goal being to minimize the difference between the text labels and the text predicted for the mask tokens and minimize the difference between the specified solution label and the joint probability value predicted for the solution.

In some embodiments, the first cost function and the second cost function are the same cost function or different cost functions.

In some embodiments, the method further comprises: receiving, by the computing system, a text string during an inference or runtime phase; inputting, by the computing system, the text string into the machine learning language model with the learned or updated model parameters for performing the task; and predicting, by the machine learning language model, a solution for the task.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments in accordance with the present disclosure will be described with reference to the drawings, in which.

DETAILED DESCRIPTION

Figure 1:
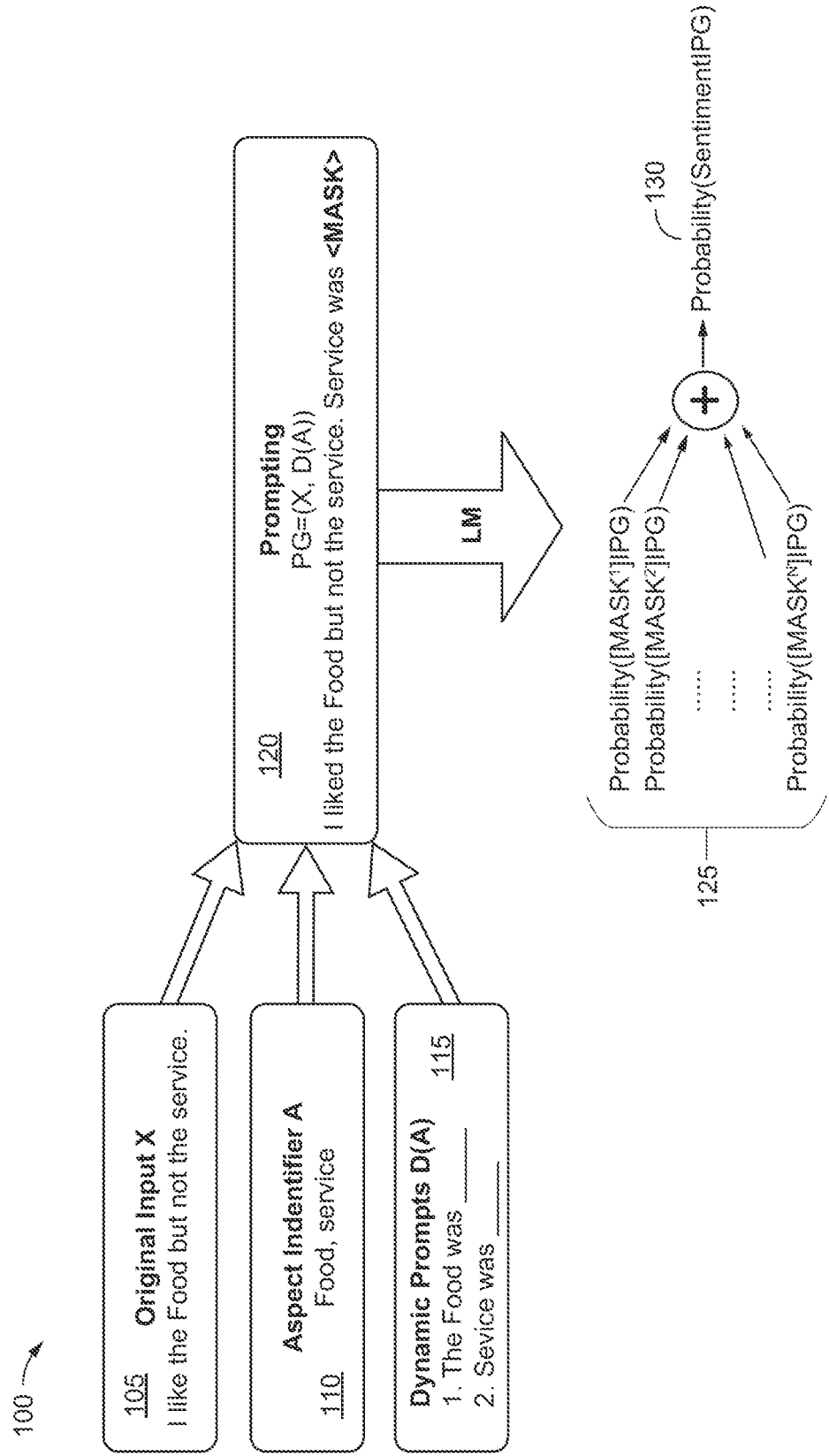
FIG. 1 is a block diagram illustrating the overall concept of dynamic aspect based prompting according to various embodiments.

In the following description, for the purposes of explanation, specific details are set forth in order to provide a thorough understanding of certain embodiments. However, it will be apparent that various embodiments may be practiced without these specific details. Furthermore, well-known features may be omitted or simplified in order not to obscure the embodiment being described. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

As discussed herein, most conventional language models follow a general training approach of pre-training and fine-tuning the model. Adding a prompting pipeline along with pre-training and fine-tuning allows these language models to close the gap and become better learners. In general, a prompt is a piece of text inserted in a training example and the prompt can be used in the reformulation of a masked language model task. Downstream tasks like sentiment classification and named entity recognition (NER) can benefit from these approaches. Conventional large language models pre-trained with prompting demonstrate the ability to infer with the help of zero shot and few shot learning and can handle a large set of downstream tasks like Q&A, sentiment analysis, NER, etc. The rising success of these conventional models such as Generative Pre-trained Transformer 3 (GPT-3) are their ability to leverage the natural language prompts alongside their giant set of parameters. For example, the authors of GPT-3 proposed using prompts based on fixed templates and demonstrated that template based prompts could benefit the "learning to recall" capabilities of GPT-3.

Prompt-based learning generally makes use of a template (discretized) or a vector based approach (continuous) to perform recall better during inference. However, the number of templates or vectors that can be created are finite and not context dependent. For example, consider the review "I went to the movies yesterday. No reason to watch", one possible (conventional) prompt template is "It was <mask>". Thereafter, the prompt template can be appended to the review and formulated as a language modeling tasks: "I went to the movies yesterday. No reason to watch. It was <mask>", where the <mask>(or blank) can be filled-in by words like terrible, horrible, terrifying, excellent, exciting, disturbing, sad, funny, etc. The finite nature of the templates (or vectors) and the absence of context in the prompt: It was <mask>limit the model's ability to capture the domain specific knowledge for a given training example.

Moreover, given that the prompt specifies the task, choosing a proper prompt has a large effect not only on the accuracy of the model, but also on which task the model performs in the first place. Creating the perfect prompt requires both an understanding of a model's inner workings and trial and error. The wrong prompt can bring bias from the pre-training dataset. For example, given "N/A" as an input, GPT-3 tends to output "positive" over "negative." There's evidence showing that language models in particular risk reinforcing undesirable stereotypes, mostly because a portion of the training data is commonly sourced from communities with prejudices around gender, race, and religious background. Beyond template limitations and biases, prompts are further limited in terms of the types of tasks they can optimize. Most prompt-based methods revolve around either text classification or generation. Information extraction, text analysis, and other, more complex tasks necessitate a less straightforward prompt design. Even for tasks where prompt-based methods are known to be effective, a model's performance will depend on both the templates/vectors being used and the answer being considered. How to simultaneously search or learn for the best combination of template/vector and answer remains a challenge.

To overcome these challenges and others, the techniques described herein are directed to improving prompt-based learning by dynamically developing a contextual set of prompts based on relevant aspects extracted. More specifically, an auto prompting framework is provided for training language models using prompt-based learning based on aspect information, which would make the model training more contextual based and would eventually help the models to be even more accurate in recalling the factual knowledge learned by the pre-trained and/or fine-tuned models on a given subject area. These approaches of auto prompting can contribute to an effective inference of downstream machine learning based models such as sentiment classification and named entity recognition as it would utilize the prompt to extract the inherent domain knowledge on a subject area along with the composite knowledge embedded in the language models via a large set of training corpus. Additionally, it is demonstrated herein that these approaches provide an enormous benefit for custom models where developing the custom models with the prompting framework can provide near state of the art performance with as low as sixteen data points. Advantageously, this is close to a 100× reduction in training time.

Take for instance the following example:
Text: The food was good but the service was bad.
Conventional Template Prompt: The food was good but the service was bad. It was _____.
Aspect Framework Prompt: The food was good but the service was bad. <Service> was _____ and/or <Food> was _____.

The approach with the conventional template prompt is not good as "It" can refer to food or service. Co-reference resolution is very ambiguous here. However, the aspect prompting framework generates prompts dynamically for "service" or "food". This provides a sufficient set of context to learn from a few shot approach (few shot being a prompt with one (1-shot) or more (n-shot, few shot) training examples).

In an exemplary embodiment, a technique implemented by a computing system for the aspect prompting includes: obtaining a set of training data comprising text examples and associated labels, where the labels comprise: (i) text labels that relate to possible solutions for a task to be learned by a machine learning language model, and (ii) specified solution labels for the task; extracting aspects from the set of training data, where each of the aspects is a subject of a text example, a topic of discussion within a text example, an entity within a text example, or any combination thereof; generating prompting templates based on the set of training data and the extracted aspects, where each of the prompting templates comprises a prompt for a text example, an aspect extracted from the text example, and a blank; concatenating each of the text examples with the respective generated prompting template to create prompting functions; training the machine learning language model on the prompting functions to predict a solution for the task, where the training is formulated as a masked language modeling problem with the blanks of the prompting templates being set as the text labels and expected output for the task being set as the specified solution labels, and where the training learns or updates model parameters of the machine learning language model for performing the task; and providing the machine learning language model with the learned or updated model parameters.

Advantageously, the dynamic prompting can be highly beneficial to develop a pre-trained model by appending the prompts to each set of input with an opinion and aspect. This will provide a better in-context learning and capture the opinion context information, which can lead to effective semantic information modelling and can benefit tasks like sentence sentiment, aspect sentiment, and question answering. Moreover, the dynamic prompting can be highly beneficial to improve confidence for downstream tasks. For example, the prompting framework can be used during the fine-tuning to provide better improvements (similar to that of pre-training). Another benefit is to improve the confidence of the output during the runtime without modifying the weights of the model. This is advantageous as this mechanism can be applied across a variety of models without modifying any information in the model, thereby providing the flexibility for the customer to use their custom model.

Dynamic Aspect Based Prompting

Prompt engineering designs training prompts for specific artificial intelligence problems using natural language in order to help a model recall information. Essentially, the prompt engineering adds "something" extra on top of the training data (not additional training data) that helps the model to recall information better and improve learning and perform better. The "something" is essentially a hint or prompt to help the model recall. The hint or prompts can be generated by hand. For example, for the text "the food is good"; the prompt hand crafted for the text could be "it was _____". But it is difficult to effectively generalize many hand crafted prompts. To overcome this problem, the prompts may be generated automatically. For example, given a specific text, a prompt may be automatically generated using discrete or continuous approaches. Various embodiments disclosed herein improve the prompting approaches further by dynamically developing a contextual set of prompts based on relevant features extracted.

FIG. 1 is a block diagram illustrating the overall concept 100 of dynamic aspect based prompting and its influence on improving the confidence in a downstream task. As shown, original input 105 is obtained from a set of training data. The original input 105 is a text example such as "I like the food but not the service" from the set of training data. The text example may be an utterance, a sentence, a portion of as sentence, a question, a statement, or the like. The set of training data is a corpus of examples for training a model (e.g., a machine learning language model) to predict a solution for a given task such as sentiment analysis or name entity recognition. For example, with respect to sentiment analysis—the set of training data may be utterances and the model is to be trained on the set of training data to predict the sentiment (e.g., positive, negative, neutral, or the like) of each utterance. The set of training data includes labels. The labels comprise: (i) text that relate to possible solutions for the given task to be learned by the model, and (ii) the specified solutions (e.g., a class identifier or ground truth for the text example). The labels may be provided by a user (e.g., a customer) and may be particular to a domain that the user intends to train the model within. For example, the text labels may be words such as terrible, bland, flavorful, delicious, disgusting, sour, sweet, poison, enjoyable, spicy, etc. that relate to various semantic classes (e.g., positive, negative, neutral, or the like) to be predicted for each text example within the domain of food. In other words, the original input 105 may include text that relates to possible solutions for the given task (e.g., the food was good but the service was bad—with good and bad being text that relate to possible sentiment solutions or classes); whereas the text labels provide alternatives for that text that relates to possible solutions and the solution labels provide the specified solutions. The solution labels may be the semantic classes (e.g., positive, negative, neutral, or the like) for each text example within the domain of food.

In order to generate a contextual set of prompts, relevant features 110 are extracted from the original input 105. The relevant features 110 are aspects of the original input 105 which allows for a dynamic prompting module to generate better prompts (explicit prompts versus the typical implicit prompts) and allows for the model being trained to understand a particular part or feature of the text being referred to within the prompt. In some instances, each feature or aspect is a subject of a text example from the training data, a topic of discussion within a text example from the training data, an entity within a text example from the training data, or any combination thereof. The relevant features or aspects are extracted using an aspect model trained in an aspect framework, as described in detail with respect to FIG. 2.

The relevant features 110 are then used for generating dynamic prompt templates 115. In some instances, a prompt template 115 is generated for each of the extracted relevant features 110. In other instances, a prompt template 115 is generated for each relevant feature (a subset of features) selected from the extracted relevant features 110. Each dynamic prompt template 115 comprises a prompt for a text example from the training data, a relevant feature 110 extracted from the text example, and a blank or open field. The prompts are in natural language and are composed of discrete tokens from the vocabulary. The prompt templates 115 are generated using a dynamic prompting module, as described in detail with respect to FIG. 2. The blank or open field is a placeholder used to generalize the template and will be filled in using the labels.

The original input 105 is then concatenated with the respective generated prompting template 115 to create a prompting function 120. For example, the original input 105 and the prompting template 115 may be used as input for a concatenate function configured to join the two text strings into a single text string: the original input 105; the prompting template 115, such that the two text strings are now linked or associated with one another.

The model is then trained on the prompting functions 120 to predict a solution for the given task. The training comprises formulating the task as a masked language modeling problem with the prompting templates 115 and the expected output for the blanks being set as the labels. More specifically, the blank in each of the prompting functions 120 is populated with the labels to create a set of prompting functions for each of the text examples. For example, for the original input 105—the labels may comprise: terrible, bland, flavorful, delicious, disgusting, and sour; where terrible and disgusting are associate with a negative sentiment class, flavorful and delicious are associated with a positive sentiment class, and bland and sour are associate with a neutral sentiment class. The blanks in the prompting template 110 may be populated with the labels such that the following prompting templates are generated for the original input 105: The food was terrible, The food was bland, The food was flavorful, The food was delicious, The food was disgusting, and The food was sour. As should be understood, a similar populating process may be performed for the service related template shown in FIG. 1.

The labels within the prompting templates are then masked with a masking token <Mask>. For example, the labels in the prompting templates are masked such that the following prompting templates are generated for the original input 105: The food was <maks$^1$>, The food was <maks$^2$>, The food was <maks$^3$>, The food was <maks$^4$>, The food was <maks$^5$>, and The food was <maks$^6$>. The prompting functions 120 with the masked prompting templates are then input into the model. The model learns statistical properties of word sequences and linguistic patterns given the words in the prompting functions 120 (i.e., the words in the original input 105 and the prompting template 115) and uses those properties and patterns to predict text for the masked labels. The conditional probability 125 of predicting the text for the masked labels provided the set of prompting functions 120 is evaluated and combined together to predict a joint probability value 130 for a class (e.g., a sentiment class), as described in detail with respect to FIG. 2.

Systems For Dynamic Aspect Based Prompting

Figure 2:
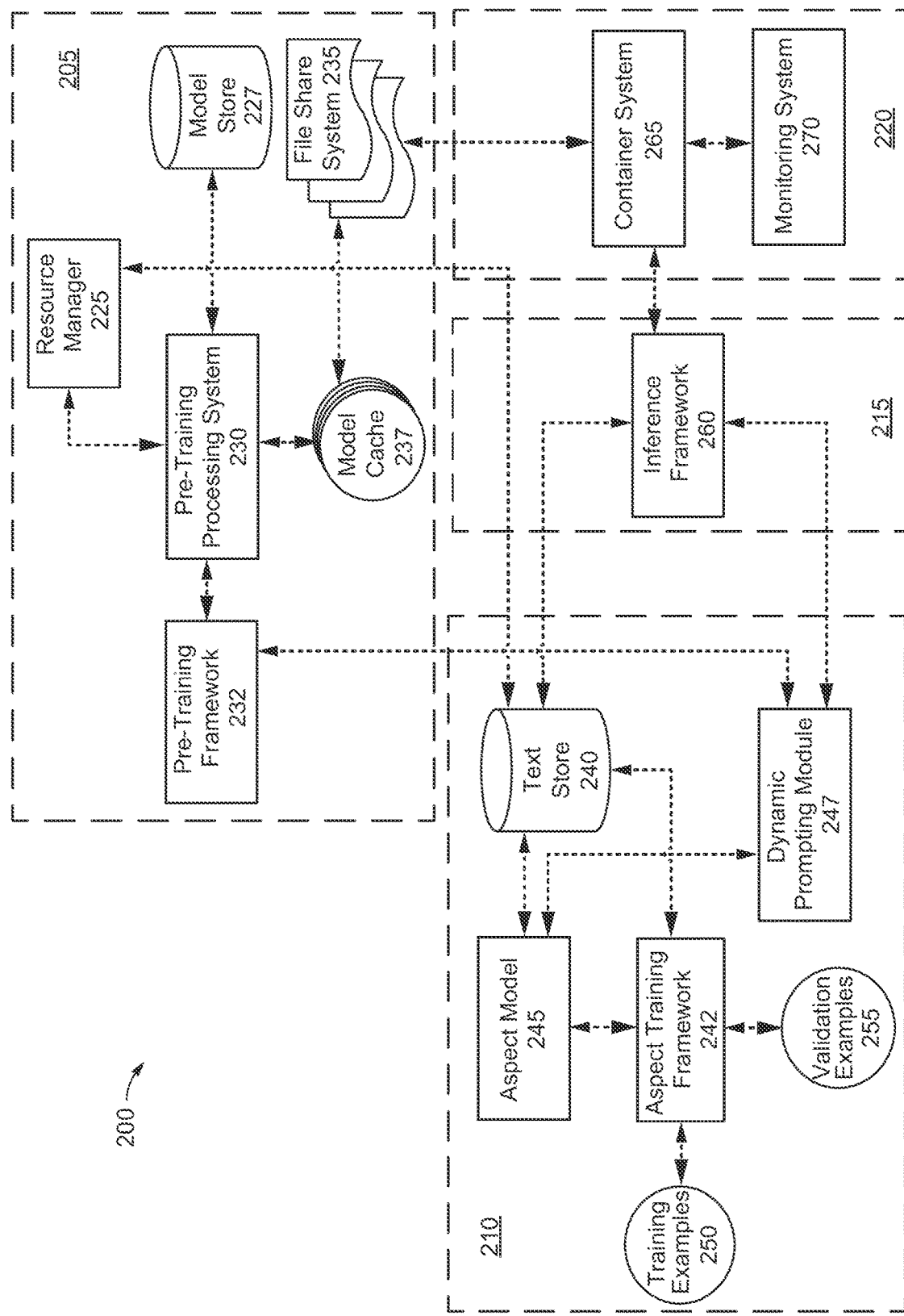
FIG. 2 is a block diagram illustrating a computing environment for implementing dynamic aspect based prompting according to various embodiments.

FIG. 2 is a block diagram illustrating a computing environment 200 for implementing dynamic aspect based prompting in accordance with various embodiments. As shown, the computing environment 200 comprises a pre-training system 205, a dynamic aspect based prompting system 210, a fine-tuning system 215, and a model deployment system 220 interconnected via one or more networks of communication, for example as part of an IaaS architecture as described in detail herein.

The pre-training system 205 comprises a resource manager 225, a model store 227, a pre-training processing system 230, a pre-training framework 232, and a file share system 235 with a model cache 237. The resource manager 225 and pre-training processing system 230 configure one or more models (e.g., a machine learning language model) for performing a task using one or more pre-training technologies. The one or more pre-training technologies may include without limitation: Word2vec, which is a shallow neural network that produces static word embeddings, BERT, which is a Transformer-encoder-based autoencoder language model for creating word embeddings and language modeling using fine-tuning-based and encoder-based methods, ELMo, which is a Long short-term memory (LSTM) based model for creating word embeddings and language modeling using encoder-based methods, GPT, which is a transformer-decoder-based autoregressive language model for creating word embeddings and language modeling using fine-tuning-based methods, XLNet, which is an autoregressive and denoise autoencoder based model for language modeling, or any combination thereof. The algorithms and hyperparameters for the one or more pre-training technologies may be identified by a user (e.g., a developer) and used for configuring the model. Additionally or alternatively, algorithms and hyperparameters may be obtained by the resource manager 225 and pre-training processing system 230 in an automated manner such as data retrieval, evaluation, optimization, and the like.

The resource manager 225, pre-training processing system 230, and pre-training framework 232 work in combination to pre-train the model. For example, the resource manager 225 may obtain sets of data for training, testing, and validating the model, the pre-training processing system 230 may implement a multi-node network for hosting and pre-training models, and the pre-training framework 232 may execute steps for pre-training the models on the multi-node network using the sets of training data, testing data, and validation data. The purpose of the pre-training is to train the model with one task to help it learn model parameters that can be used in other language processing tasks (i.e., model parameters of tasks that have been learned before are used to initialize the model parameters of new tasks).

The pre-training steps executed by the pre-training framework 232 may comprise iteratively, performing training and validation until the model has been sufficiently trained for use in the inference phase. For example, for a supervised learning-based model, the goal of the training is to learn of function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, a cost or loss function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to minimize this cost or loss function.

The training techniques may depend on the type of model that is being trained. For example, there are different types of supervised learning models, such as different types of neural network models, support vector machine (SVM) models, and others. Various different training techniques may be used. For example, as previously indicated, a loss or cost function may be defined for the model and back propagation techniques may be used to minimize this loss or minimization function. The resource manager 225, pre-training processing system 230, and pre-training framework 232 may perform training to build and train a neural network model. A neural network or neural network model represents a computational model that is inspired by the way neurons and networks of neurons work in the human brain. A neural network comprises multiple nodes arranged in layers. Each node receives an input from some other nodes, or from an external source, and computes an output. Each input to a node has an associated weight that is assigned based upon the relative importance of that input to other inputs. The node applies a function (activation function) to the weights sum of its inputs and to a bias input to generate the output. The activation function can introduce non-linearity in the output of the node. The layers of a neural network can comprise an input layer comprising one or more input nodes, an output layer comprising one or more output nodes, and zero or more hidden layers sandwiched between the input and output layers, each hidden layer comprising one or more nodes. The outputs of nodes at one layer can be provided or connected as inputs to nodes of another layer. The outputs of the output layer represent the results or predictions made by the neural network processing. The neural network can be implemented using code executing on one or more processors, where the code implements the nodes, the connections between the nodes, the functions performed by the nodes, and the processing flow through the nodes. The neural network may be trained using, for example, back propagation training techniques where the weights associated with inputs to the nodes in the neural network are manipulated with the goal to minimize the loss function associated with the output(s) provide by the output layer of the neural network.

After the model has been pre-trained, the model may then be stored in the model store 227 where the model can be obtained by one or more users for fine-tuning and/or inferencing or making predictions during the inference or runtime phase based upon real time or inferring data points. For example, a customer may obtain and use a pre-trained model to identify named entities in text. Additionally or alternatively, the model may be stored in the model cache 237 and availed to various tenants of a distributed environment such as the file share system 235. The model in the model cache 237 can either be obtained or accessed via the file share system 235 by one or more tenants for fine-tuning and/or inferencing or making predictions during the inference or runtime phase based upon real time or inferring data points.

The dynamic aspect based prompting system 210 comprises a natural language text store 240, aspect training framework 242, an aspect model 245, and a dynamic prompting module 247. The natural language text store 240 stores sets of training data comprising text examples and associated labels. The sets of training data may be associated with various domains such as financial, health care, food and service, transportation, education, and the like. The training data may be acquired from the public domain or private domain. For example, a user such as a customer in the food and service industry may provide training data for fine-tuning a model to analyze sentiment in online food blog posts. Alternatively, a query may be used to obtain all text examples within a corpus of data (e.g., a Wikipedia) pertaining to a given domain. In some instances, the text examples within a set of training data are limited in number, i.e., less than 40 examples, less than 30 examples, or less than 20 examples. This is particularly relevant for users that intend to fine-tune a model for a given domain but have very limited number of examples or data points in that domain.

The labels comprise: (i) text that relate to possible solutions for the given task to be learned by a model, and (ii) the specified solutions (e.g., a class identifier or ground truth for the text example). The labels may be provided by the user (e.g., a customer) and may be particular to the domain that the user intends to train the model within. For example, the text labels may be words such as terrible, bland, flavorful, delicious, disgusting, sour, sweet, poison, enjoyable, spicy, etc. that relate to various semantic classes (e.g., positive, negative, neutral, or the like) to be predicted for each text example within the domain of food. The solution labels may be the semantic classes (e.g., positive, negative, neutral, or the like) for each text example within the domain of food.

The aspect training framework 242 trains an aspect model 245 by acquiring aspect examples, splitting the aspect examples into a subset of aspect examples 250 for training (e.g., 90%) and a subset of aspect examples 255 for validation (e.g., 10%), preprocessing the subset of aspect examples 250 and the subset of aspect examples 255, optionally augmenting the subset of aspect examples 250, and in some instances annotating the subset of aspect examples 250 with labels. In some instances, the aspect examples are acquired from a data storage structure such as a database, open source for data sets (e.g., Kaggle, Wikipedia, or data.gov), or the like. The aspect examples include text strings with optional labeled aspects. In some instances, each aspect is a subject of a text string, a topic of discussion within a text string, an entity within a text string, or any combination thereof. The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting.

The training process for the aspect model 245 includes selecting hyperparameters for the aspect model 245 and performing iterative operations of inputting aspect examples from the subset of aspect examples 250 into the aspect model 245 to find a set of model parameters (e.g., weights and/or biases) that minimizes a cost function(s) such as loss or error function for the aspect model 245. The hyperparameters are settings that can be tuned or optimized to control the behavior of the aspect model 245. Most models explicitly define hyperparameters that control different features of the models such as memory or cost of execution. However, additional hyperparameters may be defined to adapt the aspect model 245 to a specific scenario. For example, the hyperparameters may include the number of hidden units of a model, the learning rate of a model, the convolution kernel width, or the number of kernels for a model. The cost function can be constructed to measure the difference between the outputs inferred using the aspect models 245 and the ground truth annotated to the samples using the labels. For example, utterances or text strings may be input through the aspect model 245 and the output aspects may be compared to known aspects within the utterances or text strings (ground truth). The aspect model 245 reports the differences between the output aspects and the known aspects to the aspect training framework 242 via backpropagation which trains and strengthens the aspect model 245 based on the desired output.

Once a set of model parameters are identified that minimizes a cost function(s), the aspect model 245 has been trained and can be validated using the subset of aspect examples 255 (testing or validation data set). The validation process includes iterative operations of inputting aspect examples from the subset of aspect examples 255 into the aspect model 245 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of aspect examples from the subset of aspect examples 255 are input into the aspect model 245 to obtain output (the aspects), and the output is evaluated versus ground truth aspects using correlation techniques such as Bland-Altman method and the Spearman's rank correlation coefficients and calculating performance metrics such as the error, accuracy, precision, recall, receiver operating characteristic curve (ROC), etc. Once the aspect model is tested and validated, the aspect training framework 242 outputs the trained aspect model 245 for inferencing or making aspect predictions during an inference or runtime phase based upon real time or inferring data points.

As should be understood, other training/validation mechanisms are contemplated and may be implemented within the computing environment 200. For example, the model 245 may be trained and hyperparameters may be tuned on aspect examples from the subset of aspect examples 250 and the aspect examples from the subset of aspect examples 255 may only be used for testing and evaluating performance of the aspect model 245. Moreover, although the training mechanisms described herein focus on training a new aspect model 245. These training mechanisms can also be utilized to fine-tune existing aspect models 245 trained from other datasets. For example, in some instances, an aspect model 245 might have been pre-trained using samples from datasets in one domain. In those cases, the aspect models 245 can be used for transfer learning and retrained/validated using aspect examples from another domain.

The trained aspect model 245 takes as input a set of training data from the natural language text store 240 and extracts relevant features from the set of training data. The relevant features are the aspects of the set of training data which allows for the dynamic prompting module 247 to generate better prompts (explicit prompts versus the typical implicit prompts) and allows for a model being trained to understand a particular part or feature of the text being referred to within the prompt. In some instances, each feature or aspect is a subject of a text example from the training data, a topic of discussion within a text example from the training data, an entity within a text example from the training data, or any combination thereof. The aspects are identified for extraction based on statistical properties of the aspects learned by the aspect model 245 during training and implemented during inference via the identified set of model parameters.

The extracted features (e.g., aspects) and respective text examples from the set of training data are used by the dynamic prompting module 247 for generating dynamic prompt templates. In some instances, a prompt template is generated for each of the extracted relevant features. In other instances, a prompt template is generated for each relevant feature (a subset of features) selected from the extracted relevant features. Each dynamic prompt templates comprises a prompt for a text example from the training data, a relevant feature extracted from the text example, and a blank or open field. The prompts are in natural language and are composed of discrete tokens from the vocabulary. The prompt templates may be generated by the dynamic prompting module using one or more various automated techniques including without limitation prompt mining, prompt paraphrasing, a gradient-based search, prompt generation, prompt scoring, or the like.

The prompt mining approach is a mining-based method to automatically find templates given a set of training inputs x and outputs y. This method scrapes a large text corpus (e.g., Wikipedia) for strings containing x and y, and finds either the middle words or dependency paths between the inputs and outputs. Frequent middle words or dependency paths can serve as a template as in "[X] middle words [Z]." The middle words may be searched based on the extracted features or a middle word may be replaced with an extracted feature.

Paraphrasing-based approaches take in an existing seed prompt (e.g. manually constructed or mined such as the extracted features), and paraphrases it into a set of other candidate prompts, then selects the one that achieves the highest training accuracy on the target task. This paraphrasing can be done in a number of ways, including using round-trip translation of the prompt into another language then back, using replacement of phrases from a thesaurus, or using a neural prompt rewriter specifically optimized to improve accuracy of systems using the prompt.

A gradient-based search approach such as AutoPrompt searches over actual tokens to find short sequences that can trigger the underlying pre-trained language model to generate the desired target prediction with the extracted features. This search may be performed in an iterative fashion, stepping through tokens in the prompt.

Prompt generation treats the generation of prompts as a text generation task and uses standard natural language generation models to perform this task. For example, a seq2seq pre-trained model T5 may be used for the template search process. Since T5 has been pre-trained on a task of filling in missing spans, T5 may be used to generate template tokens by (1) specifying the position to insert template tokens within a template (2) provide training samples for T5 to decode template tokens. A domain adaptation algorithm may be used to train T5 to generate unique domain relevant features (DRFs; a set of keywords that characterize domain information) for each input. Then those DRFs can be concatenated with the input to form a template and be further used by downstream tasks. In this instance, the extracted features may be used as DRFs.

Prompt scoring can be used to design a template for an input (head-relation-tail triple) using language models. First, a set of templates as potential candidates are hand-crafted with the extracted features, and then the input and answer slots are filled to form a filled prompt. A unidirectional language model is used to score those filled prompts, and the one with the highest language model probability is selected as a template. This will result in custom template for each individual input.

The dynamic prompting module 247 concatenates the generated prompting template with the respective text example to create a prompting function. For example, a prompting template and respective text example may be used as input for a concatenate function configured to join the two text strings into a single text string: the text example; the prompting template, such that the two text strings are now linked or associated with one another. The prompting functions may be stored in a storage device and/or communicated to the pre-training system 205 and/or the fine-tuning system 215 in order to further train a model on the prompting functions to predict a solution for the given task.

The fine-tuning system 215 comprises an inference framework 260. The inference framework 260 executes a fine-tuning process on a pre-trained model. The fine-tuning process includes re-training a pre-trained language model using a user's own custom data. As a result of the fine-tuning process, the model parameters of the original pre-trained language model are updated to account for the characteristics of the domain data and the task the user is interested in. For example, a user's own custom data can be stored in the natural language text store 240 as sets of data and associated labels. The sets of data may be associated with one or more domains such as financial, health care, food and service, transportation, education, and the like. In some instances, text examples within a set of training data are limited in number, i.e., less than 40 examples, less than 30 examples, or less than 20 examples. The inference framework 260 may obtain the sets of data for training, testing, and validating the pre-trained model, and execute steps for fine-tuning the pre-trained model using the sets of training data, testing data, and validation data.

The fine-tuning steps executed by the inference framework 260 may comprise iteratively, performing training and validation until the pre-trained model has been sufficiently trained for use in the inference phase. For example, for a supervised learning-based model, the goal of the training is to learn of function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, a cost or loss function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to minimize this cost or loss function. As described with respect to the pre-training system 205, the training techniques may depend on the type of model that is being trained. For example, there are different types of supervised learning models, such as different types of neural network models, support vector machine (SVM) models, and others. Various training techniques may be used depending on the type of pre-trained model to be fine-tuned.

A model may be trained on the prompting functions to predict a solution for the given task. Training using the prompting functions may be implemented in the pre-training system 205 or the fine-tuning system 215. For example, a model may be pre-trained as described with respect to pre-training system 205 and further trained on the prompting functions to predict a solution for the given task using pre-training system 205. Alternatively, a model may be fine-tuned as described with respect to fine-tuning system 215 and further trained on the prompting functions to predict a solution for the given task using the fine-tuning system 215. The prompt training is formulated as masked language modeling problem with the blanks of the prompting templates being set as the text labels and expected output for the task being set as the specified solution labels. More specifically, the blank in each of the prompting functions is populated with the labels to create a set of prompting functions for each of the text examples. The labels within the prompting templates are then masked with a masking token <Mask>. The prompting functions with the masked prompting templates are then input into the model. The model learns statistical properties of word sequences and linguistic patterns given the words in the prompting functions (i.e., the words in the text example and the prompting template) and uses those properties and patterns to predict text for the masked labels. The conditional probability of predicting the text for the mask labels provided the set of prompting functions is evaluated and combined together to predict a joint probability value for the solution such as a class (e.g., a sentiment class).

A cost (e.g., loss) is calculated between the mask label predictions and the text labels, and between the joint probability value and the solution label. For example, the losses may be calculated as the difference between the output probability distributions for each output 'token', and the true encoded labels. In some instances, prior to the masking, a label tensor is created for the prompting templates with the labels (e.g., text and solution labels). In some instances, after the inferencing/predicting, an output tensor is created for the conditional probability of predicting the mask labels and the joint probability value for a solution. The losses may be calculated as the differences between the label tensor and the output tensor. Using the losses, the required changes (e.g., gradient changes) with the model are calculated and the model parameters (e.g., weights and/or biases) are optimized. The prompting functions with the masked prompting templates are input into the model in an iterative operation to find a set of the model parameters that minimizes the cost function(s) for the model.

Once a set of model parameters are identified that minimizes a cost function(s), the model has been trained and can be validated using a subset of text examples (testing or validation data set). The validation process includes iterative operations of inputting text examples from the subset of text examples into the model using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of text examples from the subset of text examples may be input into the language model to obtain output (e.g., the predicted class), and the output is evaluated versus ground truth aspects using correlation techniques such as Bland-Altman method and the Spearman's rank correlation coefficients and calculating performance metrics such as the error, accuracy, precision, recall, receiver operating characteristic curve (ROC), etc.

Once the model is tested and validated, the pre-training system 205 or the fine-tuning system 215 outputs the model for inferencing or making aspect predictions during an inference or runtime phase based upon real time or inferring data points. The pre-training system 205 or the fine-tuning system 215 may also be used to improve the confidence of current solution predictions by appending prompts to text during the inference or runtime phase.

After the pre-trained model is trained, the pre-trained model has been fine-tuned, or after the pre-trained model or fine-tuned model has been exposed to prompt training, the model may then be deployed using the model deployment system 220. The language model may be deployed in a container based system 265 such as Kubernetes with a health monitoring service 270. The language model in container based system 265 can be used for inferencing or making predictions during the inference or runtime phase based upon real time or inferring data points. The health monitoring service 270 can monitor the health of the models on the container based system 265, and trigger retraining or fine-tuning of models as needed (e.g., upon detection of drift or upon provisioning of a new domain). Although, the models are described as being deployed in a container based system, it should be understood that any other type of system may be used for deploying models in a run time phase without departing from the spirit of the present disclosure.

Techniques For Dynamic Aspect Based Prompting

Figure 3:
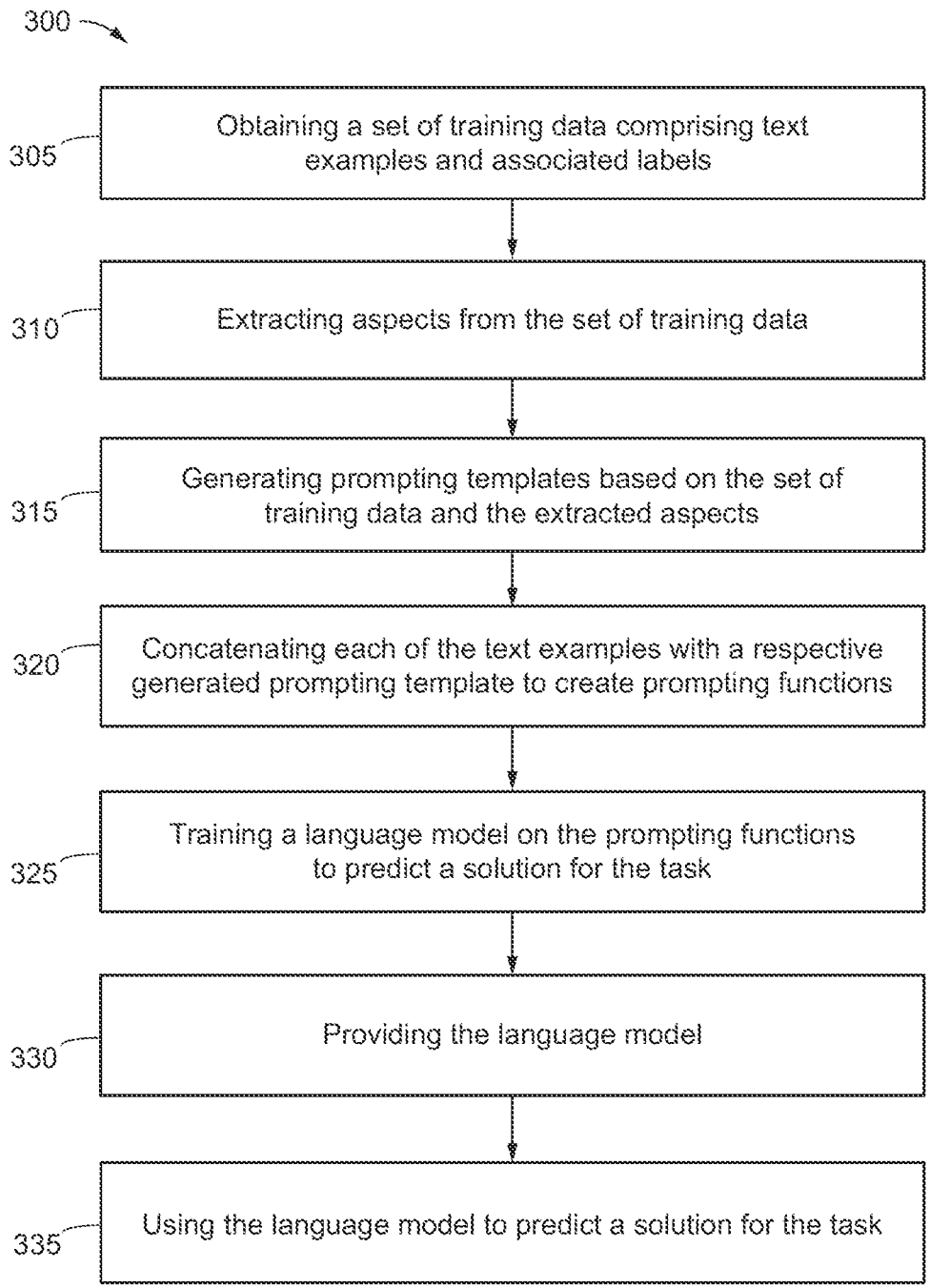
FIG. 3 is a flow diagram illustrating a computing system for prompt training a model according to various embodiments.

FIG. 3 illustrates processes and operations for dynamic aspect based prompting. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIG. 3 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 3 is not intended to be limiting. Other sequences of steps may also be performed according to alternative embodiments. For example, in alternative embodiments the steps outlined above may be performed in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 shows a flowchart 300 that illustrates a workflow by a computing system for prompt training a model in accordance with various embodiments. The processes depicted in the flowchart 300 may be implemented by the architecture, systems, and techniques depicted in FIGS. 1 and 2. At step 305, a set of training data comprising text examples and associated labels is obtained. The labels comprise: (i) text that relate to possible solutions for a task to be learned by a model (e.g., a machine learning language), and (ii) specified solutions for the task. In some instances, the set of training data is obtained from a user such as a customer. In some instances, the text examples within the set of training data are limited in number, i.e., less than 40 examples, less than 30 examples, or less than 20 examples. In some instances, the model is pre-trained, as described with respect to FIG. 2. In other instances, the model is fine-tuned, as described with respect to FIG. 2.

At step 310, aspects are extracted from the set of training data using an aspect model. Each of the aspects is a subject of a text example, a topic of discussion within a text example, an entity within a text example, or any combination thereof. To learn what an aspect is, the aspect model is trained to detect a word or string of words that form an aspect within a text string such as an utterance. The aspects are detected for extraction based on statistical properties of the aspects learned by the aspect model during the training and implemented during inference via a learned set of model parameters.

At step 320, prompting templates are generated based on the set of training data and the extracted aspects. Each of the prompting templates comprises a prompt for a text example, an aspect extracted from the text example, and a blank. The prompt templates may be generated using one or more various automated techniques including without limitation prompt mining, prompt paraphrasing, a gradient-based search, prompt generation, prompt scoring, or the like.

At step 325, each of the text examples is concatenated with the respective generated prompting template to create prompting functions. In some instances, a concatenate function is configured to join each of the text examples with the respective generated prompting template into a prompting function such that the text examples and respective generated prompting templates are linked or associated with one another.

At step 330, the model is trained on the prompting functions to predict a solution for the task. The training is formulated as a masked language modeling problem with the blanks of the prompting templates being set as the text labels and expected output for the task being set as the specified solution labels. In some instances, the text labels are various words associated with sentiment, the task is sentiment analysis, and the expected output is a sentiment class for the text example (e.g., positive, negative, or neutral). The training causes model parameters of the model to be learned or updated for performing the task.

The training may comprise, for each prompting function: (a) completing the blank with text labels associated with the text example to generate multiple unique prompting templates for the text example, (b) masking the text labels with mask tokens, (c) predicting, by the model, text for the mask tokens based on learned statistical properties of word sequences and linguistic patterns given text in the prompting function, (d) evaluating, by the model, conditional probabilities for predicting the text for the mask tokens provided the prompting function, (e) combining, by the model, the conditional probabilities together to predict a joint probability value for the solution (e.g., a predicted class), (f) measuring a difference between the text labels and the text predicted for the mask tokens using a first cost function, (g) measuring a difference between a specified solution label and the joint probability value predicted for the solution using a second cost function, and (h) modifying the model parameters with goal being to minimize the difference between the text labels and the text predicted for the mask tokens and minimize the difference between the specified solution label and the joint probability value predicted for the solution. The training may be performed iteratively (steps a-h) for each prompting function and/or until a specified condition is met, e.g., the model achieves a accuracy above a given threshold. The first cost function and the second cost function may be the same cost function or different cost functions.

At step 335, the model is provided with the learned or updated model parameters. The providing may comprise deploying the model on a system (e.g., a container system or a client system) where the model can be used for inferencing or making predictions during the inference or runtime phase based upon real time or inferring data points.

At step 340, a text string is received during the inference or runtime phase, the text string is input into the model with the learned or updated model parameters for performing the task, and the model predicts a solution for the task.

Table 1 shows the result for prompt based fine-tuning in few shot cases using Stanford Sentiment Treebank datasets with a BERT-base-uncased language model. As shown, aspect prompting, as disclosed herein alone or with demonstrations, provides a significant boost in model performance as measured by accuracy of the model, and using a very limited number of data points (16), aspect prompting is able to achieve accuracy comparable to fine-tuning a model using a fairly large dataset (>100 data points).

TABLE 1

| | Train Data Size | SST-2 (Acc) | SST-5 (Acc) |
|---|---|---|---|
| Standard Fine-tuning (no prompt) | 16 per class | 71.2 | 31.8 |
| Conventional Prompt Fine-tuning | 16 per class | 84.7 | 38.7 |
| Aspect Prompt Fine-tuning | 16 per class | 86.2 | 40.1 |
| Conventional Prompt + Demonstrations | 16 per class | 92.6 | 50.6 |
| Aspect Prompt + Demonstrations | 16 per class | 93.8 | 52.4 |
| Full conventional Fine-tuning | All Training Samples | 95 | 58.7 |

Infrastructure as a Service For Dynamic Aspect Based Prompting

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 4:
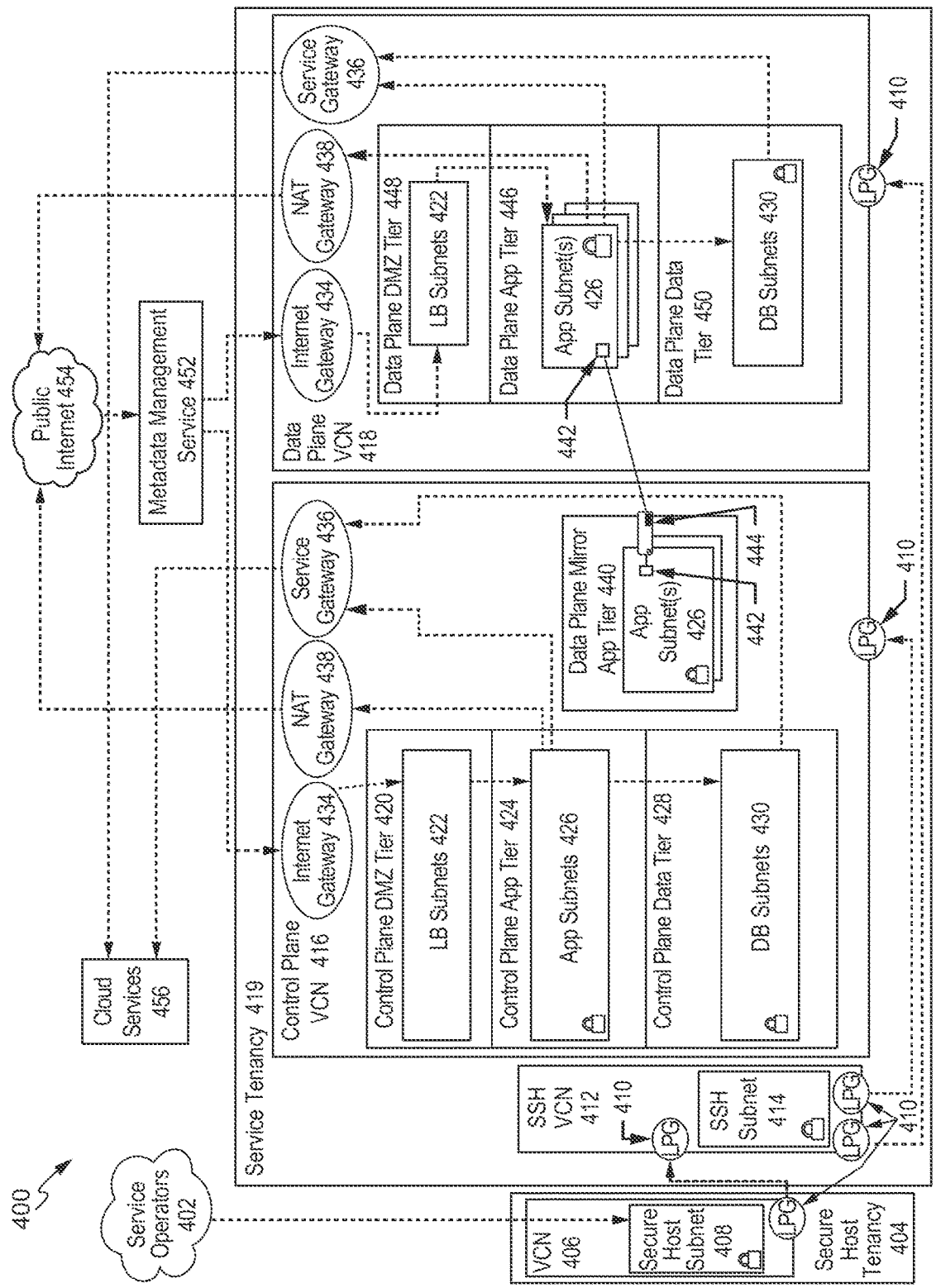
FIG. 4 is a block diagram illustrating one pattern for implementing a cloud infrastructure as a service system, according to at least one embodiment.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Memory that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
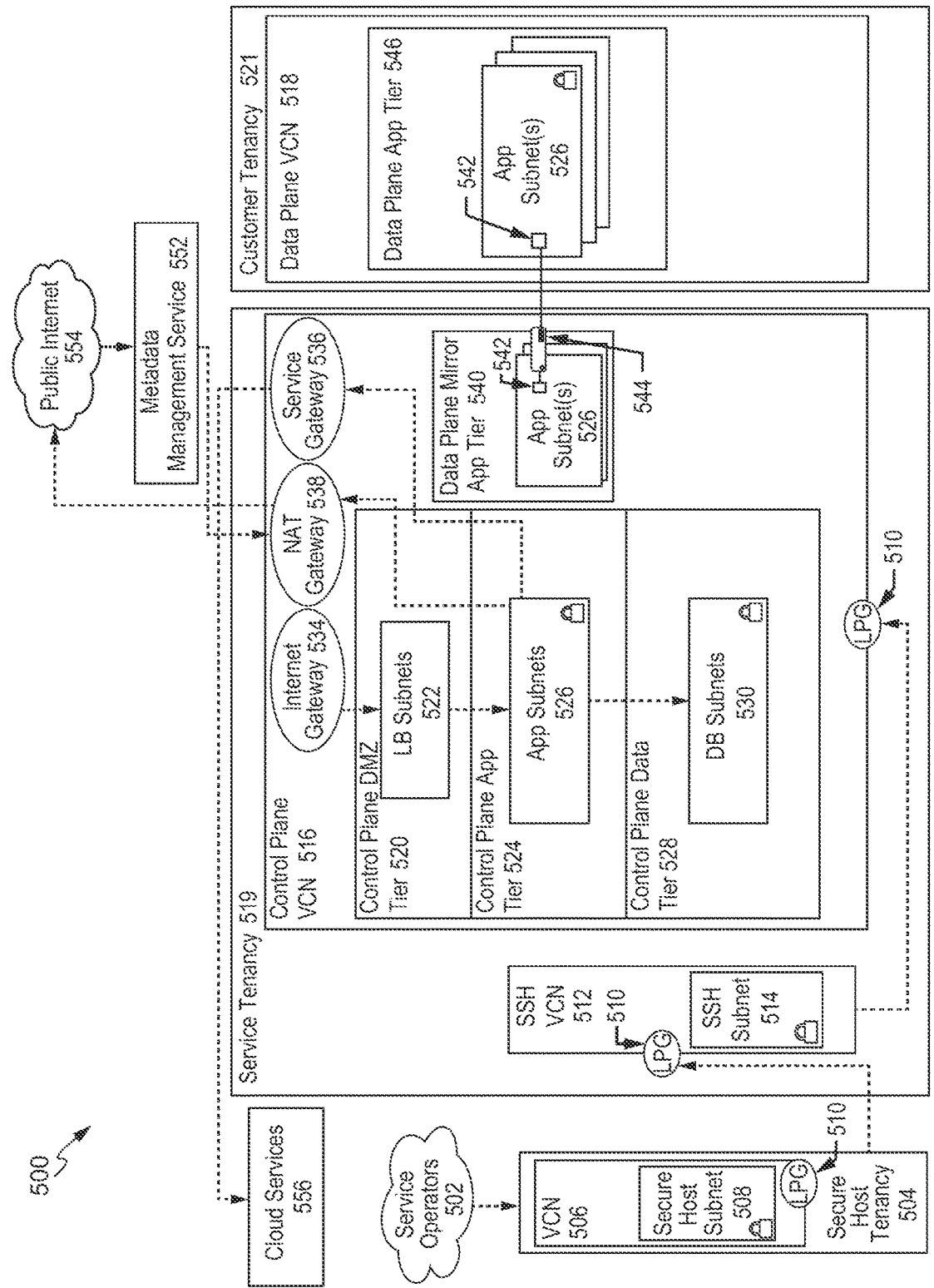
FIG. 5 is a block diagram illustrating another pattern for implementing a cloud infrastructure as a service system, according to at least one embodiment.

FIG. 5 is a block diagram 500 illustrating another example pattern of an IaaS architecture, according to at least one embodiment. Service operators 502 (e.g., service operators 402 of FIG. 4) can be communicatively coupled to a secure host tenancy 504 (e.g., the secure host tenancy 404 of FIG. 4) that can include a virtual cloud network (VCN) 506 (e.g., the VCN 406 of FIG. 4) and a secure host subnet 508 (e.g., the secure host subnet 408 of FIG. 4). The VCN 506 can include a local peering gateway (LPG) 510 (e.g., the LPG 410 of FIG. 4) that can be communicatively coupled to a secure shell (SSH) VCN 512 (e.g., the SSH VCN 412 of FIG. 4) via an LPG 410 contained in the SSH VCN 512. The SSH VCN 512 can include an SSH subnet 514 (e.g., the SSH subnet 414 of FIG. 4), and the SSH VCN 512 can be communicatively coupled to a control plane VCN 516 (e.g., the control plane VCN 416 of FIG. 4) via an LPG 510 contained in the control plane VCN 516. The control plane VCN 516 can be contained in a service tenancy 519 (e.g., the service tenancy 419 of FIG. 4), and the data plane VCN 518 (e.g., the data plane VCN 418 of FIG. 4) can be contained in a customer tenancy 521 that may be owned or operated by users, or customers, of the system.

The control plane VCN 516 can include a control plane DMZ tier 520 (e.g., the control plane DMZ tier 420 of FIG. 4) that can include LB subnet(s) 522 (e.g., LB subnet(s) 422 of FIG. 4), a control plane app tier 524 (e.g., the control plane app tier 424 of FIG. 4) that can include app subnet(s) 526 (e.g., app subnet(s) 426 of FIG. 4), a control plane data tier 528 (e.g., the control plane data tier 428 of FIG. 4) that can include database (DB) subnet(s) 530 (e.g., similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g., the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g., the service gateway 436 of FIG. 4) and a network address translation (NAT) gateway 538 (e.g., the NAT gateway 438 of FIG. 4). The control plane VCN 516 can include the service gateway 536 and the NAT gateway 538.

The control plane VCN 516 can include a data plane mirror app tier 540 (e.g., the data plane mirror app tier 440 of FIG. 4) that can include app subnet(s) 526. The app subnet(s) 526 contained in the data plane mirror app tier 540 can include a virtual network interface controller (VNIC) 542 (e.g., the VNIC of 442) that can execute a compute instance 544 (e.g., similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g., the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g., the metadata management service 452 of FIG. 4) that can be communicatively coupled to public Internet 554 (e.g., public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g., cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

Figure 6:
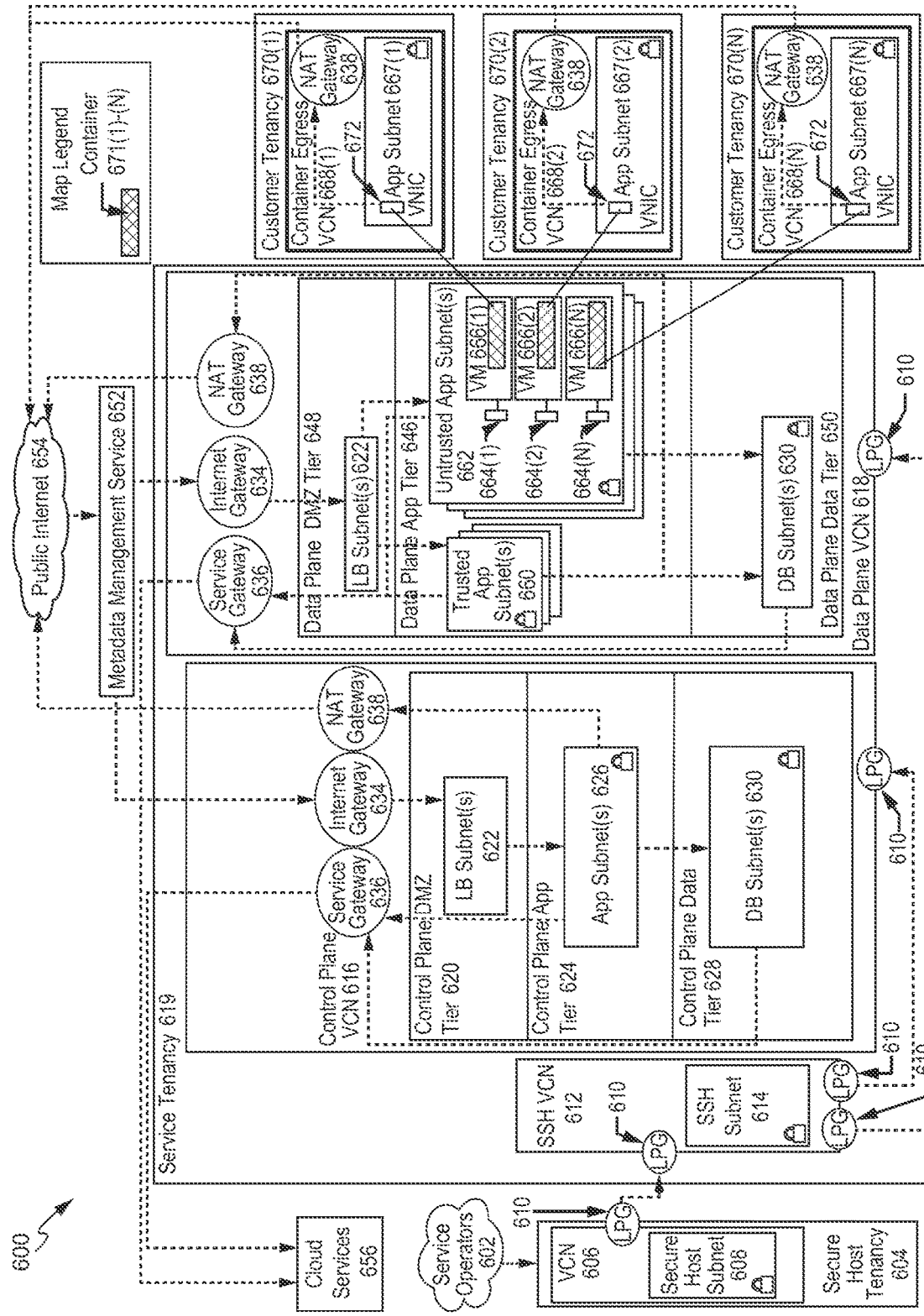
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 402 of FIG. 4) can be communicatively coupled to a secure host tenancy 604 (e.g., the secure host tenancy 404 of FIG. 4) that can include a virtual cloud network (VCN) 606 (e.g., the VCN 406 of FIG. 4) and a secure host subnet 608 (e.g., the secure host subnet 408 of FIG. 4). The VCN 606 can include an LPG 610 (e.g., the LPG 410 of FIG. 4) that can be communicatively coupled to an SSH VCN 612 (e.g., the SSH VCN 412 of FIG. 4) via an LPG 610 contained in the SSH VCN 612. The SSH VCN 612 can include an SSH subnet 614 (e.g., the SSH subnet 414 of FIG. 4), and the SSH VCN 612 can be communicatively coupled to a control plane VCN 616 (e.g., the control plane VCN 416 of FIG. 4) via an LPG 610 contained in the control plane VCN 616 and to a data plane VCN 618 (e.g., the data plane 418 of FIG. 4) via an LPG 610 contained in the data plane VCN 618. The control plane VCN 616 and the data plane VCN 618 can be contained in a service tenancy 619 (e.g., the service tenancy 419 of FIG. 4).

The control plane VCN 616 can include a control plane DMZ tier 620 (e.g., the control plane DMZ tier 420 of FIG. 4) that can include load balancer (LB) subnet(s) 622 (e.g., LB subnet(s) 422 of FIG. 4), a control plane app tier 624 (e.g., the control plane app tier 424 of FIG. 4) that can include app subnet(s) 626 (e.g., similar to app subnet(s) 426 of FIG. 4), a control plane data tier 628 (e.g., the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g., the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g., the service gateway of FIG. 4) and a network address translation (NAT) gateway 638 (e.g., the NAT gateway 438 of FIG. 4). The control plane VCN 616 can include the service gateway 636 and the NAT gateway 638.

The data plane VCN 618 can include a data plane app tier 646 (e.g., the data plane app tier 446 of FIG. 4), a data plane DMZ tier 648 (e.g., the data plane DMZ tier 448 of FIG. 4), and a data plane data tier 650 (e.g., the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g., public Internet 454 of FIG. 4).

The Internet gateway 634 contained in the control plane VCN 616 and contained in the data plane VCN 618 can be communicatively coupled to a metadata management service 652 (e.g., the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
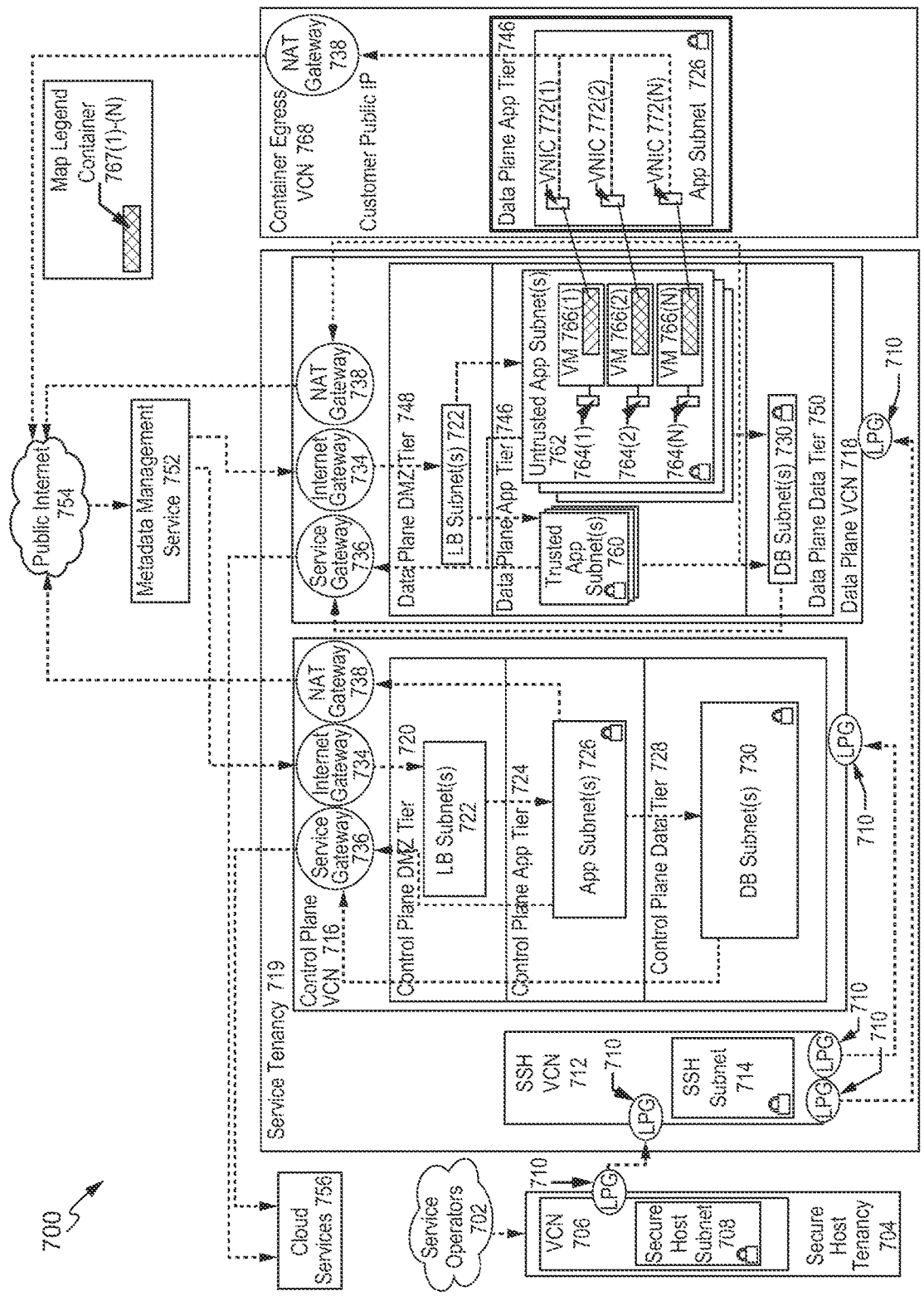
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 402 of FIG. 4) can be communicatively coupled to a secure host tenancy 704 (e.g., the secure host tenancy 404 of FIG. 4) that can include a virtual cloud network (VCN) 706 (e.g., the VCN 406 of FIG. 4) and a secure host subnet 708 (e.g., the secure host subnet 408 of FIG. 4). The VCN 706 can include an LPG 710 (e.g., the LPG 410 of FIG. 4) that can be communicatively coupled to an SSH VCN 712 (e.g., the SSH VCN 412 of FIG. 4) via an LPG 710 contained in the SSH VCN 712. The SSH VCN 712 can include an SSH subnet 714 (e.g., the SSH subnet 414 of FIG. 4), and the SSH VCN 712 can be communicatively coupled to a control plane VCN 716 (e.g., the control plane VCN 416 of FIG. 4) via an LPG 710 contained in the control plane VCN 716 and to a data plane VCN 718 (e.g., the data plane 418 of FIG. 4) via an LPG 710 contained in the data plane VCN 718. The control plane VCN 716 and the data plane VCN 718 can be contained in a service tenancy 719 (e.g., the service tenancy 419 of FIG. 4).

The control plane VCN 716 can include a control plane DMZ tier 720 (e.g., the control plane DMZ tier 420 of FIG. 4) that can include LB subnet(s) 722 (e.g., LB subnet(s) 422 of FIG. 4), a control plane app tier 724 (e.g., the control plane app tier 424 of FIG. 4) that can include app subnet(s) 726 (e.g., app subnet(s) 426 of FIG. 4), a control plane data tier 728 (e.g., the control plane data tier 428 of FIG. 4) that can include DB subnet(s) 730 (e.g., DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g., the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 4) and a network address translation (NAT) gateway 738 (e.g., the NAT gateway 438 of FIG. 4). The control plane VCN 716 can include the service gateway 736 and the NAT gateway 738.

The data plane VCN 718 can include a data plane app tier 746 (e.g., the data plane app tier 446 of FIG. 4), a data plane DMZ tier 748 (e.g., the data plane DMZ tier 448 of FIG. 4), and a data plane data tier 750 (e.g., the data plane data tier 450 of FIG. 4). The data plane DMZ tier 748 can include LB subnet(s) 722 that can be communicatively coupled to trusted app subnet(s) 760 (e.g., trusted app subnet(s) 660 of FIG. 6) and untrusted app subnet(s) 762 (e.g., untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g., public Internet 454 of FIG. 4).

The Internet gateway 734 contained in the control plane VCN 716 and contained in the data plane VCN 718 can be communicatively coupled to a metadata management service 752 (e.g., the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
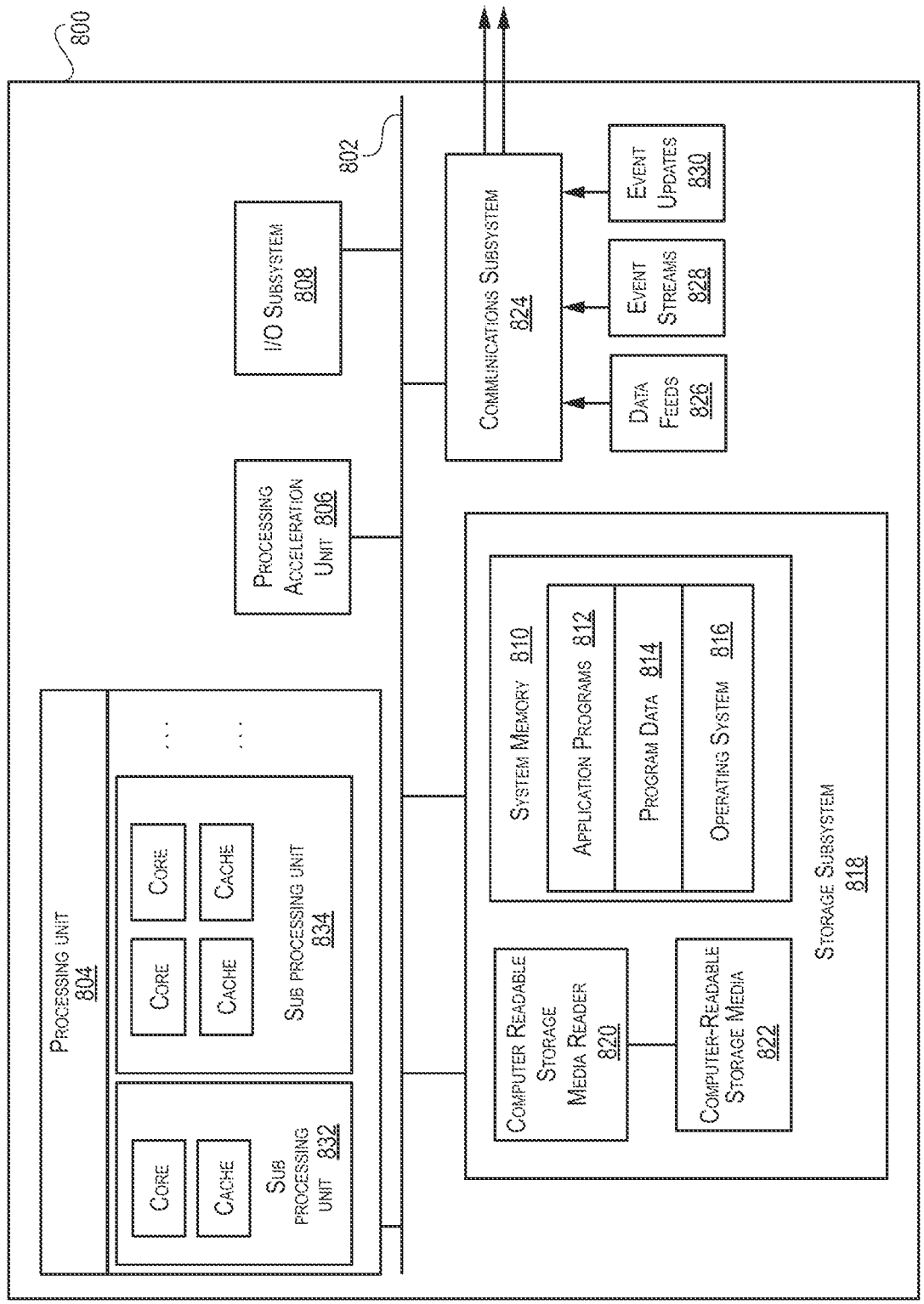
FIG. 8 is a block diagram illustrating an example computer system, according to at least one embodiment.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   obtaining a set of training data comprising text examples and associated labels, wherein the associated labels comprise: (i) text labels that relate to possible solutions for a task to be learned by a machine learning language model, and (ii) specified solution labels for the task, wherein the machine learning language model is a pre-trained model or a fine-tuned model;
   extracting aspects from the set of training data, wherein each of the aspects is a subject of a text example, a topic of discussion within a text example, an entity within a text example, or any combination thereof;
   generating prompting templates based on the set of training data and the extracted aspects, wherein each of the prompting templates comprises a prompt for a text example, an aspect extracted from the text example, and a blank;
   concatenating each of the text examples with a respective prompting template to create prompting functions, each of the prompting functions comprising a text example that is appended with a prompt and an aspect, which correspond to the text example, and a blank;
   refining the machine learning language model by performing a prompt-based learning using the prompting functions to predict a solution for the task, the performing the prompt-based learning comprising training the machine learning language model by formulating the task as a masked language modeling problem with the blanks of the prompting templates being set as the text labels and expected output for the task being set as the specified solution labels, wherein the refining learns or updates model parameters of the machine learning language model for performing the task; and
   providing the machine learning language model with the learned or updated model parameters.

2. The method of claim 1, wherein the set of training data comprises less than twenty text examples.

3. The method of claim 1, wherein the aspects are extracted using an aspect model and the aspects are detected for extraction based on statistical properties of the aspects learned by the aspect model during training and implemented during inference via a learned set of model parameters.

4. The method of claim 1, wherein the training comprises, for each prompting function:
   (a) completing the blank with text labels associated with the text example to generate multiple unique prompting templates for the text example,
   (b) masking the text labels with mask tokens,
   (c) predicting, by the machine learning language model, text for the mask tokens based on learned statistical properties of word sequences and linguistic patterns given text in the prompting function,
   (d) evaluating, by the machine learning language model, conditional probabilities for predicting the text for the mask tokens provided the prompting function, and
   (e) combining, by the machine learning language model, the conditional probabilities together to predict a joint probability value for the solution.

5. The method of claim 4, wherein the training further comprises, for each prompting function:
   (f) measuring a difference between the text labels and the text predicted for the mask tokens using a first cost function,
   (g) measuring a difference between a specified solution label and the joint probability value predicted for the solution using a second cost function, and
   (h) modifying the model parameters with goal being to minimize the difference between the text labels and the text predicted for the mask tokens and minimize the difference between the specified solution label and the joint probability value predicted for the solution.

6. The method of claim 5, wherein the first cost function and the second cost function are the same cost function or different cost functions.

7. The method of claim 1, further comprising:
   receiving a text string during an inference or runtime phase;
   inputting the text string into the machine learning language model with the learned or updated model parameters for performing the task; and
   predicting, by the machine learning language model, a solution for the task.

8. A system comprising:
   one or more data processors; and
   a non-transitory computer readable storage medium containing instructions which, when executed on the one or more data processors, cause the one or more data processors to perform actions including:
   obtaining a set of training data comprising text examples and associated labels, wherein the associated labels comprise: (i) text labels that relate to possible solutions for a task to be learned by a machine learning language model, and (ii) specified solution labels for the task, wherein the machine learning language model is a pre-trained model or a fine-tuned model;
   extracting aspects from the set of training data, wherein each of the aspects is a subject of a text example, a topic of discussion within a text example, an entity within a text example, or any combination thereof;
   generating prompting templates based on the set of training data and the extracted aspects, wherein each of the prompting templates comprises a prompt for a text example, an aspect extracted from the text example, and a blank;
   concatenating each of the text examples with a respective prompting template to create prompting functions, each of the prompting functions comprising a text example that is appended with a prompt and an aspect, which correspond to the text example, and a blank;
   refining the machine learning language model by performing a prompt-based learning using the prompting functions to predict a solution for the task, the performing the prompt-based learning comprising training the machine learning language model by formulating the task as a masked language modeling problem with the blanks of the prompting templates being set as the text labels and expected output for the task being set as the specified solution labels, wherein the refining learns or updates model parameters of the machine learning language model for performing the task; and providing the machine learning language model with the learned or updated model parameters.

9. The system of claim 8, wherein the set of training data comprises less than twenty text examples.

10. The system of claim 8, wherein the aspects are extracted using an aspect model and the aspects are detected for extraction based on statistical properties of the aspects learned by the aspect model during training and implemented during inference via a learned set of model parameters.

11. The system of claim 8, wherein the training comprises, for each prompting function:
   (a) completing the blank with text labels associated with the text example to generate multiple unique prompting templates for the text example,
   (b) masking the text labels with mask tokens,
   (c) predicting, by the machine learning language model, text for the mask tokens based on learned statistical properties of word sequences and linguistic patterns given text in the prompting function,
   (d) evaluating, by the machine learning language model, conditional probabilities for predicting the text for the mask tokens provided the prompting function, and
   (e) combining, by the machine learning language model, the conditional probabilities together to predict a joint probability value for the solution.

12. The system of claim 11, wherein the training further comprises, for each prompting function:
   (f) measuring a difference between the text labels and the text predicted for the mask tokens using a first cost function,
   (g) measuring a difference between a specified solution label and the joint probability value predicted for the solution using a second cost function, and
   (h) modifying the model parameters with goal being to minimize the difference between the text labels and the text predicted for the mask tokens and minimize the difference between the specified solution label and the joint probability value predicted for the solution.

13. The system of claim 12, wherein the first cost function and the second cost function are the same cost function or different cost functions.

14. The system of claim 8, wherein the actions further comprise:
   receiving a text string during an inference or runtime phase;
   inputting the text string into the machine learning language model with the learned or updated model parameters for performing the task; and
   predicting, by the machine learning language model, a solution for the task.

15. A computer-program product tangibly embodied in a non-transitory machine-readable storage medium, including instructions configured to cause one or more data processors to perform actions including:
   obtaining a set of training data comprising text examples and associated labels, wherein the associated labels comprise: (i) text labels that relate to possible solutions for a task to be learned by a machine learning language model, and (ii) specified solution labels for the task, wherein the machine learning language model is a pre-trained model or a fine-tuned model;
   extracting aspects from the set of training data, wherein each of the aspects is a subject of a text example, a topic of discussion within a text example, an entity within a text example, or any combination thereof;
   generating prompting templates based on the set of training data and the extracted aspects, wherein each of the prompting templates comprises a prompt for a text example, an aspect extracted from the text example, and a blank;
   concatenating each of the text examples with a respective prompting template to create prompting functions, each of the prompting functions comprising a text example that is appended with a prompt and an aspect, which correspond to the text example, and a blank;
   refining the machine learning language model by performing a prompt-based learning using the prompting functions to predict a solution for the task, the performing the prompt-based learning comprising training the machine learning language model by formulating the task as a masked language modeling problem with the blanks of the prompting templates being set as the text labels and expected output for the task being set as the specified solution labels, wherein the refining learns or updates model parameters of the machine learning language model for performing the task; and
   providing the machine learning language model with the learned or updated model parameters.

16. The computer-program product of claim 15, wherein the set of training data comprises less than twenty text examples.

17. The computer-program product of claim 15, wherein the aspects are extracted using an aspect model and the aspects are detected for extraction based on statistical properties of the aspects learned by the aspect model during training and implemented during inference via a learned set of model parameters.

18. The computer-program product of claim 15, wherein the training comprises, for each prompting function:
   (a) completing the blank with text labels associated with the text example to generate multiple unique prompting templates for the text example,
   (b) masking the text labels with mask tokens,
   (c) predicting, by the machine learning language model, text for the mask tokens based on learned statistical properties of word sequences and linguistic patterns given text in the prompting function,
   (d) evaluating, by the machine learning language model, conditional probabilities for predicting the text for the mask tokens provided the prompting function, and
   (e) combining, by the machine learning language model, the conditional probabilities together to predict a joint probability value for the solution.

19. The computer-program product of claim 18, wherein the training further comprises, for each prompting function:
   (f) measuring a difference between the text labels and the text predicted for the mask tokens using a first cost function,
   (g) measuring a difference between a specified solution label and the joint probability value predicted for the solution using a second cost function, and
   (h) modifying the model parameters with goal being to minimize the difference between the text labels and the text predicted for the mask tokens and minimize the difference between the specified solution label and the joint probability value predicted for the solution.

20. The computer-program product of claim 19, wherein the first cost function and the second cost function are the same cost function or different cost functions.

* * * * *

UNITED STATES PATENT AND TRADEMARK OFFICE
CERTIFICATE OF CORRECTION

| | |
|---|---|
| PATENT NO. | : 12,175,204 B2 |
| APPLICATION NO. | : 17/584068 |
| DATED | : December 24, 2024 |
| INVENTOR(S) | : Reza et al. |

Page 1 of 1

It is certified that error appears in the above-identified patent and that said Letters Patent is hereby corrected as shown below:

On the Title Page

Page 2, Column 2, Item (56) under Other Publications, Line 2, delete "Juy" and insert -- July --, therefor.

In the Drawings

On sheet 1 of 8, under Reference Numeral 110, in FIG. 1, Line 1, delete "Indentifier" and insert -- Identifier --, therefor.

On sheet 1 of 8, under Reference Numeral 115, in FIG. 1, Line 3, delete "Sevice" and insert -- Service --, therefor.

In the Specification

In Column 27, Line 62, delete "810" and insert -- 810. --, therefor.

Signed and Sealed this
First Day of April, 2025

Coke Morgan Stewart
*Acting Director of the United States Patent and Trademark Office*